United States Patent Office 3,298,783
Patented Jan. 17, 1967

3,298,783
PHOSPHORIC ACID CONCENTRATION
Gerald I. Gruber and Walter Lyman Staker, Salt Lake City, Utah, assignors to Stauffer Chemical Company, New York, N.Y., a corporation of Delaware
No Drawing. Filed Oct. 23, 1959, Ser. No. 848,206
1 Claim. (Cl. 23—165)

This invention relates in general to the concentration of dilute wet process phosphoric acid to yield a product suitable for neutralization with ammonia without the customary sludge formation, which product may be stored for substantial periods of time without evidence of gelation or solids formation.

Wet process phosphoric acid, as manufactured, is not suitable for sale for use in the production of liquid fertilizers by dilution and direct ammoniation because of the large quantities of sludge deposited when the acid is partially or wholly neutralized with ammonia. The sludges deposited consist for the most part of partially or wholly hydrolyzed salts of aluminum and iron, and are of such character that they do not flow freely through the nozzles used for field application of liquid fertilizer. Also, these form an objectionable sludge in customer storage tanks.

It is therefore an object of this invention to provide a method of treating wet process phosphoric acid to produce a grade of acid suitable for use in the manufacture of liquid fertilizers by dilution and direct ammoniation.

It is another object of this invention to provide a process for the concentration of wet process phosphoric acid to levels suitable for use in the manufacture of liquid fertilizer as noted above, which process does not cause the formation of sludge materials and which process may be carried out under conditions such that the corrosion of the metallic alloys contacting the acid is minimized, thus making possible the use of readily available commercial alloys in vessels, lines and other equipment.

A method has been proposed for treating wet process phosphoric acid so that sufficient condensed phosphoric (pyrophosphoric) acids are formed during the concentration step to sequester the contained iron and aluminum salts and thus to prevent precipitation thereof during neutralization of the acid with ammonia. In order to reach the proper concentration level, at least 65 weight percent $P_2O_5$ and preferably about 68 to 72 weight percent $P_2O_5$ content, the level at which effective sequestration takes place, heating at temperatures of 500–545° F. at atmospheric pressure for wet process acids produced from Florida phosphate rock or at temperatures of 425–450° F. at atmospheric pressure for wet process acids produced from Western phosphate rock is required to remove a quantity of the water present by distillation. However, it has been found that at such temperatures corrosion rates encountered where any of the common corrosion resistant alloys are used are excessive. Hence, plants attempting to employ the aforementioned atmospheric distillation process for the concentration of wet process phosphoric acid to 68–72% $P_2O_5$ content by atmospheric distillation would be restricted to the use of the noble metals, graphite and perhaps the polymeric tetrafluoroethylene plastics as materials for construction of lines and vessels.

This invention involves the reduced pressure vaporization of water from wet process phosphoric acid at temperatures sufficiently low that common available alloys may be used in contact with the acid without excessive corrosion.

The preferred product of the invention is a 68–72 weight percent $P_2O_5$ content phosphoric acid consisting of a "eutectic" mixture of orthophosphoric and condensed phosphoric (pyrophosphoric) acids. Salient characteristics of this mixture are that it is relatively sludge-free and may be ammoniated directly (if desired, coincident with water dilution) to formulate various grades of clear, liquid, neutral N-P fertilizers without the excessive sludge deposition normally encountered when a wet process phosphoric acid is ammoniated. This neutralized product is of very low solids content and flows readily at normal temperatures.

More particularly, this invention uses as a starting material the common 27–55% $P_2O_5$ wet process $H_3PO_4$. This relatively dilute material is preferably "clarified" by allowing it to stand for a period of between about 1 and 14 days to allow the majority of solid materials to settle out, or is clarified by appropriate chemical treatment techniques known to the trade. The clarified acid is continuously fed to a stainless steel vacuum concentrator maintained at a total pressure of between 10 and 150 mm. mercury absolute, preferably about 40–60 mm. of mercury absolute. The temperature of the acid is adjusted to between about 280–380° F., preferably 340–350° F. The volumetric displacement residence time of the phosphoric acid in the concentrator is sufficient to yield a product of about 68–72% $P_2O_5$ content—generally a period in excess of two hours and preferably between about 10 and 12 hours. The product may be concentrated to an even greater extent, e.g., to yield a product of as high as 74% $P_2O_5$ or slightly higher. But the optimum $P_2O_5$ content falls within the range 68–72% for it is here that the "eutectic" mixture of orthophosphoric and pyrophosphoric acids is formed which remains fluid at normal temperatures, and wherein the metallic ion impurities are sequestered by the action of the pyrophosphoric acid, thus preventing precipitation when the acid is simultaneously diluted and ammoniated to the neutral point. The only impurity actually removed during the course of this process is the fluorine which is volatilized as HF or $SiF_4$.

As suggested above, because of the lower temperatures which can be used with vacuum concentration, the corrosion rates for the commonly available commercial alloys are substantially lessened. See Table I below, which sets out test results for a phosphoric acid prepared from Western phosphate rock:

TABLE I

| Temp., °F. | Pressure, mm. Hg Absolute | $P_2O_5$ Content, Weight Percent | Corrosion Rate, Inches Per Yr. | | |
|---|---|---|---|---|---|
| | | | Alloy 20[1] | Nionel[2] | S.S. 318[3] |
| 360 | 50 | 70.7 | 0.003 | 0.002 | 0.005 |

[1] Carpenter's Alloy 20.
[2] Ni-O-Nel—TM International Nickel Co.
[3] Stainless Steel 318.

By contrast, where temperatures suitable for atmospheric pressure concentration of wet process acids produced from Western phosphate rock are used, the corrosion rates are as follows:

TABLE II

| Temp., °F. | $P_2O_5$ Content, Weight Percent | Corrosion Rate, Inches Per Year | | |
|---|---|---|---|---|
| | | Alloy 20 | Nionel | S.S. 318 |
| 400 | 66.0 | 0.954 | 0.537 | 3.71 |
| 450 | 71.5 | 0.089 | 0.047 | 0.778 |

Examples are set forth below for illustrative purposes. These are not to be regarded as imposing limitations on the scope of the invention other than as set forth in the appended claims.

Example I

A 52% $P_2O_5$ wet process phosphoric acid prepared from Western phosphate rock and which had been clarified in the conventional fashion (by settling to remove the majority of the suspended solids) was fed to an enclosed tank containing agitating means. Five liters of the aforementioned feed already had been concentrated to 70 weight percent $P_2O_5$ content in the tank. A heating mantle was provided for maintaining the internal fluids temperature at about 345° F. The portion of the enclosed tank containing the vapor phase was connected via a water-cooled condenser to a second receiver tank and thence to a water aspirator; total gaseous pressure in the concentrating tank was maintained at about 50 mm. of mercury absolute. The 52% $P_2O_5$ wet process phosphoric acid feed was fed continuously at the rate of 1.7 to 2.1 kg. per hour. The tank was so sized that phosphoric acid entering could be maintained therein for a period of about 10 hours, after which time acid began to overflow from the tank and to descend through a cooling coil wherein the temperature was lowered to 130° F. Thereafter the acid passed to a 5-gallon polyethylene receiver tank. From 1.3 to 1.6 kg. per hour of concentrated wet process phosphoric acid whose $P_2O_5$ content was 70% by weight overflowed from the reaction vessel through the cooling coil. The acid product contained less than 0.1% by weight solids and remained fluid at room temperatures indefinitely.

Example II

In an additional run, a heat exchanger was utilized for treatment of the same 52% $P_2O_5$ clarified wet process phosphoric acid. The acid undergoing concentration was continuously recirculated by a pump from a hot well through the heat exchange device and thence to a flash vaporization chamber. Thereafter the acid was returned to the hot well. In an alternative process set-up, the acid was continuously recirculated by a pump from the hot well through the tubes of a falling film evaporator and thence to a gas-liquid separation chamber from which the liquid was returned to the hot well. Concentrated acid equal in quantity to the feed phosphoric acid less materials vaporized was continuously withdrawn from the system. Either the flash vaporization chamber or the gas-liquid separation chamber, depending upon the apparatus set-up, was connected through an appropriate condenser and fume scrubber to a vacuum source. Heat input from the heating medium to the phosphoric acid was maintained at a level sufficient to establish and maintain an acid temperature of 280–380° F. The product was withdrawn, cooled to 130° F. and stored. It exhibited the same properties as the product of Example I.

The highly concentrated wet process phosphoric acid produced by the preceding process may be diluted and ammoniated simultaneously to form a clear, solids-free liquid fertilizer solution of 10% by weight nitrogen content and 30% by weight $P_2O_5$ content whose pH will be between 6.2 and 7.0; the neutral liquid fertilizer solution thus formed may be stored in steel without excessive corrosion of the steel container.

Example III

An additional run was made with Florida wet process phosphoric acid, which contained 54 weight percent $P_2O_5$ at the outset. The feed stock was clarified in the conventional fashion and processed in the equipment described in Example I. A total of 80 pounds (about 5 gallons) of the concentrated 69.5% product was obtained, containing 51.5 weight percent $P_2O_5$ as orthophosphoric acid and 18 weight percent $P_2O_5$ as condensed phosphoric acid. The length of the run was about 57 hours and the average residence time in the concentrator about 9 hours. An absolute pressure of 50 mm. of mercury was employed. The temperature of the acid within the concentrator ranged between 340–360° F. This product was tested for its effect on various alloys and corrosion rates were determined. For Nionel, the corrosion rate was found to be 0.005 inch per year. For Alloy 20, it was found to be 0.008 inch per year and for S.S. 318, it was found to be 0.014 inch per year, all measured at a temperature of 360° F. The 69.5 weight percent $P_2O_5$ product was simultaneously diluted and ammoniated to produce a satisfactory grade of 10–30–0 liquid fertilizer without encountering any noticeable precipitation of solids. A portion of the high strength acid product was stored and no evidence of gelation or solids formation was noted throughout the storage period.

An additional advantage of this invention is that, in contrast to the reported 69% by weight $P_2O_5$ content acids produced by atmospheric pressure concentration which solidify at room temperature, acids with $P_2O_5$ content in excess of 70% by weight may be produced which remain fluid at room temperatures indefinitely.

Obviously, many modifications and variations of this invention may be made without departing from the spirit and scope thereof and only such limitations should be imposed as are indicated in the appended claim.

We claim:

A process for the preparation of a concentrated phosphoric acid having a $P_2O_5$ content of 68–72 weight percent and having aluminum and iron impurities therein which consists essentially of: heating wet process phosphoric acid containing between about 27 and about 55 weight percent $P_2O_5$ and containing aluminum and iron impurities therein to a temperature of between about 280° F. and about 380° F. while under a pressure of between about 10 and about 150 mm. of mercury absolute for a period of time sufficient to concentrate said phosphoric acid to between about 68 and 72 weight percent $P_2O_5$ and for a period of time sufficient to form a mixture of orthophosphoric and pyrophosphoric acids which remains fluid, said period of time being not in excess of about twelve hours, said pyrophosphoric acid sequestering the said iron and aluminum impurities therein whereby to prevent precipitation thereof when said acid is diluted and ammoniated, said heating and concentrating being conducted with said acid in direct contact with processing equipment constructed of a normally corrodible metallic material which would be uneconomical due to excessive corrosion should the heating and concentrating be conducted at atmospheric pressure, and recovering said concentrated phosphoric acid having said 68–72 weight percent of $P_2O_5$ therein.

References Cited by the Examiner

UNITED STATES PATENTS

| 2,847,285 | 8/1958 | Pahud | 23—165 |
| 2,917,367 | 12/1959 | Hodges et al. | 23—165 |
| 2,933,372 | 4/1960 | Manning | 23—165 |
| 3,192,013 | 6/1965 | Young | 23—165 |

OSCAR R. VERTIZ, *Primary Examiner.*

MAURICE A. BRINDISI, *Examiner.*

A. SCIAMANNA, O. F. CRUTCHFIELD,
*Assistant Examiners.*